US011973389B2

(12) United States Patent
Neubauer et al.

(10) Patent No.: US 11,973,389 B2
(45) Date of Patent: Apr. 30, 2024

(54) ACTUATOR FOR EXCITING VIBRATION HAVING AT LEAST ONE ELECTRICALLY CONDUCTIVE RING

(71) Applicant: Continental Engineering Services GmbH, Frankfurt (DE)

(72) Inventors: Philipp Neubauer, Frankfurt am Main (DE); Charalampos Ferekidis, Frankfurt am Main (DE); Dimitrios Patsouras, Frankfurt am Main (DE); Robert Joest, Frankfurt am Main (DE); Stephan Eisele, Frankfurt am Main (DE); Johannes Kerkmann, Frankfurt am Main (DE); Karsten Moritz, Frankfurt am Main (DE); Pascal Köhler, Frankfurt am Main (DE); Robert Wick, Frankfurt am Main (DE); Jens Friedrich, Frankfurt am Main (DE)

(73) Assignee: Continental Engineering Services GmbH, Frankfurt (DE)

( * ) Notice: Subject to any disclaimer, the term of this patent is extended or adjusted under 35 U.S.C. 154(b) by 1 day.

(21) Appl. No.: 17/509,449

(22) Filed: Oct. 25, 2021

(65) Prior Publication Data

US 2022/0140717 A1   May 5, 2022

(30) Foreign Application Priority Data

Nov. 2, 2020  (DE) ............... 10 2020 213 768.4

(51) Int. Cl.
*H02K 33/00* (2006.01)
*H02K 33/02* (2006.01)

(52) U.S. Cl.
CPC .................. *H02K 33/02* (2013.01)

(58) Field of Classification Search
CPC ...... H02K 35/00; H02K 35/02; H02K 11/046; H02K 7/1869; H02K 7/1876; H02K 41/02;
(Continued)

(56) References Cited

U.S. PATENT DOCUMENTS 4,412,317 A * 10/1983 Asjes ............... G01V 1/181
367/187
5,231,336 A * 7/1993 van Namen ......... F16F 7/1011
318/128
(Continued)

FOREIGN PATENT DOCUMENTS

CN    102714770 A    10/2012
DE    102016225722 A1   6/2018
(Continued)

OTHER PUBLICATIONS

Electrical Resistivity and Conductivity Wikipedia.*
(Continued)

*Primary Examiner* — Maged M Almawri
(74) *Attorney, Agent, or Firm* — BUCHANAN INGERSOLL & ROONEY PC

(57) ABSTRACT

An actuator for exciting at least one component of a motor vehicle with vibrations. The actuator includes: a housing which is configured to be directly or indirectly connected to the component, an electrical coil which is connected to the housing and is configured to generate an electromagnetic field when an electric current flows through the coil, and a magnet which is entirely or partially arranged in the housing and the magnet is arranged so as to be movable to a limited extent relative to the housing. The housing has, all around, at least one electrically conductive ring which surrounds the magnet in respect of its undeflected state.

12 Claims, 4 Drawing Sheets

(58) Field of Classification Search
CPC ........ H02K 33/00; H02K 33/02; H02K 33/04; H02K 33/06; H02J 1/00; H02N 11/00; H02N 11/002; H02N 11/04
USPC ....... 310/29, 12, 12.12, 12.01, 12.03, 12.13, 310/12.16, 12.211, 2.24, 12.26, 25, 15, 310/13, 16; 335/229
See application file for complete search history.

(56) References Cited

U.S. PATENT DOCUMENTS

| | | | | |
|---|---|---|---|---|
| 5,973,422 | A * | 10/1999 | Clamme | H02K 33/16 310/90.5 |
| 6,501,357 | B2 * | 12/2002 | Petro | H02K 33/16 335/229 |
| 6,983,923 | B2 * | 1/2006 | Fukui | F16K 31/082 335/229 |
| 7,078,832 | B2 * | 7/2006 | Inagaki | H02K 7/14 335/238 |
| 7,449,803 | B2 * | 11/2008 | Sahyoun | H02K 33/16 310/23 |
| 7,586,220 | B2 * | 9/2009 | Roberts | H02K 1/34 290/1 R |
| 7,671,493 | B2 * | 3/2010 | Takashima | G06F 3/016 310/15 |
| 7,791,456 | B2 * | 9/2010 | Miura | B06B 1/045 340/407.1 |
| 7,911,098 | B2 * | 3/2011 | Lee | H02K 33/16 310/20 |
| 8,013,480 | B2 * | 9/2011 | Bang | B06B 1/045 310/12.33 |
| 8,097,991 | B2 * | 1/2012 | Masami | H02K 33/16 310/15 |
| 8,188,623 | B2 * | 5/2012 | Park | H02K 33/16 310/12.01 |
| 8,278,786 | B2 * | 10/2012 | Woo | H02K 33/16 310/15 |
| 8,288,899 | B2 * | 10/2012 | Park | H02K 33/16 310/71 |
| 8,575,794 | B2 * | 11/2013 | Lee | H02K 33/18 310/15 |
| 8,736,086 | B2 * | 5/2014 | Yang | H02K 35/02 290/1 R |
| 9,025,796 | B2 | 5/2015 | Furuichi et al. | |
| 9,461,530 | B2 * | 10/2016 | Wasenczuk | B06B 1/04 |
| 9,473,854 | B2 * | 10/2016 | Yasuike | H04R 1/028 |
| 9,695,806 | B2 * | 7/2017 | Van Brunt | H02K 33/16 |
| 9,815,085 | B2 * | 11/2017 | Chun | G06F 3/016 |
| 9,906,109 | B2 * | 2/2018 | Endo | H02K 33/16 |
| 10,079,531 | B2 * | 9/2018 | Xu | H02K 5/04 |
| 10,307,791 | B2 * | 6/2019 | Xu | B06B 1/045 |
| 10,328,461 | B2 * | 6/2019 | Xu | B06B 1/045 |
| 10,486,196 | B2 * | 11/2019 | Chai | B06B 1/045 |
| 10,630,142 | B2 * | 4/2020 | Kanaya | H02K 33/02 |
| 10,710,115 | B2 * | 7/2020 | Huang | H02K 33/02 |
| 10,778,075 | B2 * | 9/2020 | Mao | H02K 33/02 |
| 10,855,156 | B2 * | 12/2020 | Matsuyama | H02K 33/18 |
| 2003/0102739 | A1 * | 6/2003 | Yoneyama | H02K 33/06 310/81 |
| 2003/0146825 | A1 * | 8/2003 | Kaneda | H04M 1/03 381/396 |
| 2004/0119343 | A1 * | 6/2004 | Ueda | G10K 9/22 310/12.31 |
| 2005/0099255 | A1 | 5/2005 | Zhang | |
| 2005/0112001 | A1 | 5/2005 | Bahnen et al. | |
| 2005/0225181 | A1 * | 10/2005 | Tu | H02K 35/00 310/15 |
| 2006/0002577 | A1 * | 1/2006 | Won | B06B 1/045 381/396 |
| 2007/0052302 | A1 * | 3/2007 | Cheung | B82Y 25/00 310/12.25 |
| 2007/0085425 | A1 * | 4/2007 | Hirashima | H02K 33/16 310/15 |
| 2007/0182257 | A1 * | 8/2007 | Miura | H04R 9/02 310/23 |
| 2007/0205674 | A1 | 9/2007 | Tseng et al. | |
| 2009/0033157 | A1 * | 2/2009 | Maemura | H02K 41/03 310/12.25 |
| 2009/0250032 | A1 * | 10/2009 | Fullerton | H03K 3/45 123/143 B |
| 2009/0320219 | A1 * | 12/2009 | Takahashi | H02K 33/16 15/21.1 |
| 2011/0018364 | A1 * | 1/2011 | Kim | H02K 33/18 310/20 |
| 2011/0018365 | A1 * | 1/2011 | Kim | B06B 1/045 310/20 |
| 2011/0062803 | A1 * | 3/2011 | Lee | H02K 33/18 310/29 |
| 2011/0068640 | A1 * | 3/2011 | Choi | H02K 5/04 310/25 |
| 2011/0089773 | A1 * | 4/2011 | Choi | H02K 33/16 310/25 |
| 2011/0133577 | A1 * | 6/2011 | Lee | H02K 33/18 310/15 |
| 2011/0193426 | A1 * | 8/2011 | Chung | H02K 33/16 310/25 |
| 2011/0193427 | A1 * | 8/2011 | Lemieux | F03G 7/08 310/25 |
| 2011/0198948 | A1 * | 8/2011 | Keisuke | H02K 5/225 310/25 |
| 2011/0198949 | A1 * | 8/2011 | Furuich | H02K 33/16 310/25 |
| 2011/0254385 | A1 * | 10/2011 | Makino | H02K 41/03 310/12.14 |
| 2011/0291497 | A1 * | 12/2011 | Choi | H02K 33/18 310/25 |
| 2012/0032535 | A1 * | 2/2012 | Park | H02K 35/02 310/25 |
| 2012/0039491 | A1 * | 2/2012 | Katz | H04R 9/022 381/150 |
| 2012/0098380 | A1 * | 4/2012 | Wang | H02K 15/0442 310/260 |
| 2012/0109029 | A1 * | 5/2012 | Ma | H04R 11/02 310/16 |
| 2012/0146557 | A1 * | 6/2012 | Pyo | H02P 31/00 310/25 |
| 2012/0169148 | A1 * | 7/2012 | Kim | H02K 33/16 310/25 |
| 2012/0293022 | A1 * | 11/2012 | Park | B06B 1/045 310/25 |
| 2013/0033128 | A1 * | 2/2013 | Yoon | H02K 33/18 310/25 |
| 2013/0033129 | A1 * | 2/2013 | Hong | B06B 1/045 310/25 |
| 2013/0043766 | A1 * | 2/2013 | Takahashi | H04R 17/00 310/326 |
| 2013/0076162 | A1 * | 3/2013 | Papakyriacou | B06B 1/045 267/153 |
| 2013/0099600 | A1 * | 4/2013 | Park | B06B 1/045 310/15 |
| 2013/0285479 | A1 * | 10/2013 | Kinoshita | H02K 35/02 310/12.12 |
| 2013/0342037 | A1 * | 12/2013 | Kawarai | H02K 35/02 310/30 |
| 2014/0009008 | A1 | 1/2014 | Li et al. | |
| 2014/0062225 | A1 * | 3/2014 | Kim | H02K 33/00 310/15 |
| 2014/0103751 | A1 * | 4/2014 | Furukawa | H02K 35/02 310/25 |
| 2014/0132089 | A1 * | 5/2014 | Jeon | H02K 33/18 310/14 |
| 2014/0265651 | A1 * | 9/2014 | Kim | H02K 33/16 310/25 |
| 2015/0172821 | A1 * | 6/2015 | Lee | H04R 9/046 381/410 |
| 2015/0194870 | A1 * | 7/2015 | Kim | H02K 33/18 310/25 |
| 2015/0295485 | A1 * | 10/2015 | Sutani | H02K 15/03 310/12.18 |

(56) References Cited

U.S. PATENT DOCUMENTS

| | | | | |
|---|---|---|---|---|
| 2015/0296280 | A1* | 10/2015 | Lee | B06B 3/00 381/412 |
| 2016/0126821 | A1* | 5/2016 | Iwaki | H02K 7/08 310/12.21 |
| 2016/0149517 | A1* | 5/2016 | Choi | H02N 1/04 427/58 |
| 2016/0149518 | A1* | 5/2016 | Wang | F03B 13/14 310/310 |
| 2016/0190903 | A1* | 6/2016 | Ohishi | H02K 35/04 310/28 |
| 2017/0033653 | A1* | 2/2017 | Wang | H02K 33/16 |
| 2017/0033673 | A1* | 2/2017 | Wang | H02K 33/16 |
| 2017/0144191 | A1* | 5/2017 | Mao | B06B 1/045 |
| 2017/0288523 | A1* | 10/2017 | Katada | H02P 25/032 |
| 2017/0328441 | A1* | 11/2017 | Kanaya | F16F 13/26 |
| 2017/0346376 | A1* | 11/2017 | Kim | H02K 15/02 |
| 2018/0026514 | A1* | 1/2018 | Mao | H02K 5/225 310/12.16 |
| 2018/0297074 | A1* | 10/2018 | Huang | B06B 1/045 |
| 2019/0157958 | A1* | 5/2019 | Mao | H02K 33/12 |
| 2019/0267882 | A1* | 8/2019 | Matsuyama | H02K 33/02 |
| 2020/0304005 | A1* | 9/2020 | Mao | H02K 33/16 |
| 2021/0328491 | A1* | 10/2021 | Takahashi | H02K 33/06 |
| 2022/0123642 | A1* | 4/2022 | Takahashi | B06B 1/045 |
| 2022/0140717 | A1* | 5/2022 | Neubauer | H02K 33/16 310/28 |

FOREIGN PATENT DOCUMENTS

| | | |
|---|---|---|
| EP | 0653331 A1 | 5/1995 |
| EP | 2992972 A1 | 3/2016 |
| GB | 806331 A | 12/1958 |
| JP | 2005106242 A | 4/2005 |
| JP | 2013529436 A | 7/2013 |
| JP | 2013223334 A | 10/2013 |
| KR | 101586766 B1 | 1/2016 |
| WO | 9502275 A1 | 1/1995 |
| WO | 2010076656 A2 | 7/2010 |
| WO | 2010113038 A2 | 10/2010 |
| WO | 2011104659 A2 | 9/2011 |
| WO | 2011158434 A1 | 12/2011 |
| WO | 2012064799 A1 | 5/2012 |
| WO | 2016124684 A1 | 8/2016 |
| WO | 2020045470 A1 | 3/2020 |

OTHER PUBLICATIONS

Extended European Search Report for European Application No. 21204967.0, dated Mar. 24, 2022, with translation, 12 pages.
German Examination Report for German Application No. 10 2020 213 768.4, dated Apr. 8, 2021, with translation, 9 pages.
Korean Request for the Submission of an Opinion for Korean Application No. 10-2021-7032179 dated Jul. 1, 2023 with translation, 13 pages.
German Search Report for German Application No. 10 2019 205 278.9, dated Dec. 6, 2019, with partial English translation, 9 pages.
Japanese Notice of Reasons for Refusal for Japanese Application No. 2021-560434, dated Oct. 20, 2022 with translation, 12 pages.
International Search Report and Written Opinion for International Application No. PCT/EP2020/060215, dated Jul. 3, 2020, 9 pages.
German Examination Report for German Application No. 10 2019 205 278.9, dated Dec. 6, 2019, with English translation, 8 pages.
Non Final Office Action for U.S. Appl. No. 17/602,036, dated May 10, 2023, 19 pages.
Chinese Office Action for Chinese Application No. 202080027668.9, dated Oct. 31, 2023 with translation, 13 pages.
Notice of Allowance for U.S. Appl. No. 17/602.036, dated Nov. 29, 2023, 27 pages.

* cited by examiner

ACTUATOR FOR EXCITING VIBRATION HAVING AT LEAST ONE ELECTRICALLY CONDUCTIVE RING

CROSS REFERENCE TO RELATED APPLICATIONS

This application claims priority to German Patent Application No. 10 2020 213 768.4, filed Nov. 2, 2020, the contents of such application being incorporated by reference herein.

FIELD OF THE INVENTION

The invention relates to an actuator for exciting at least one component of a motor vehicle with vibrations.

SUMMARY OF THE INVENTION

An aspect of the invention is an actuator which is of relatively precise design and/or is relatively cost-effective and/or exhibits improved damping.

As an alternative, an aspect of the invention preferably relates to an actuator for exciting at least one component of a motor vehicle with vibrations, wherein the actuator has the following:
  a housing which is configured to be directly or indirectly connected to the component,
  at least one electrical coil which is connected to the housing and is configured to generate an electromagnetic field when an electric current flows through the coil, and
  at least one magnet which is entirely or partially arranged in the housing and
  the magnet is arranged so as to be movable to a limited extent relative to the housing, wherein the housing has, all around, at least one ring which is formed from substantially non-permanently magnetized, ferromagnetic material or contains this material, wherein the ring surrounds the magnet in respect of its undeflected state. In particular, this ring is formed from electrically conductive material or has an electrically conductive loop or band which is closed all around.

The component is expediently configured as a flat component or as a flat structure or as one of the following structures of a motor vehicle, as a floor panel, door structure panel, trunk lid, spare wheel recess, roof structure, cross-member, fender, longitudinal member, door carrier, end wall or frame part. Here, this structure is configured, in particular, as carbon and/or glass fiber-reinforced plastic, GFRP, and/or carbon fiber-reinforced plastic, CFRP, or steel or aluminum.

The magnet is expediently configured as a permanent magnet, in particular composed of ferromagnetic material, for example neodymium iron boron.

The direction of movement of the magnet is preferably understood to mean its direction of vibration, here in particular the direction of vibration in which it vibrates due to driving by the coil.

The ring or band expediently has, substantially in its center, a cutout/hole through which the magnet can move.

The actuator preferably has a housing which is configured to be directly or indirectly connected to the component, in particular indirectly via at least one intermediate layer or at least one additional intermediate element between the housing and the component.

The one electrical coil is preferably rigidly connected to the housing.

The magnet is preferably arranged so as to be movable to a limited extent, substantially in respect of one degree of freedom, in particular substantially parallel to the longitudinal direction through the coil.

The ring is expediently configured in particular in an annular manner, here in particular in the manner of a circular ring or as an oval band. As an alternative, the ring preferably has a polygonal shape in respect of its closed circumferential line or its boundary line, wherein its corners may be rounded or rounded off.

The undeflected state of the magnet is expediently understood to mean an inoperative state or an inoperative position or an unexcited state, in particular without an action of force and/or with zero current applied to the coil, of the magnet in respect of its movement in the housing.

The actuator is preferably configured such that the ring and/or the housing surrounds or encircles or wraps around or is configured all around the magnet in respect of its undeflected state.

The ring preferably surrounds the magnet substantially centrally in the undeflected state in respect of its height in the direction of movement. In particular, if the height of the ring is lower than the height of the magnet, the ring surrounds the magnet so that, in the undeflected state of the magnet, the magnet projects beyond the region which is surrounded by the ring on either side in the direction of movement of the magnet, particularly preferably substantially equally on either side.

The electrically conductive ring is preferably formed from ferromagnetic material or the actuator has at least one additional ring composed of ferromagnetic material, wherein this additional ring surrounds the magnet in respect of its undeflected state. In particular, the electrically conductive ring surrounds the additional ring, or the other way around, and the electrically conductive ring and the additional ring are in this case arranged together in or on the housing or are part of the housing. Owing to the preferred use of ferromagnetic material in the ring or in an additional ring, defined resetting or a defined resetting force in respect of the deflection of the magnet along its direction of movement is achieved.

It is preferred that the electrically conductive ring is partially or fully incorporated into the housing and/or is arranged on the housing and/or is part of the housing.

It is expedient that the electrically conductive ring and the additional ferromagnetic ring are not permanently magnetized.

The height of the ring is preferably substantially equal to the height of the magnet in respect of the direction of movement of the magnet.

It is expedient that the height of the ring is at most 50%, in particular at most 30%, greater than the height of the magnet in respect of the direction of movement of the magnet.

As an alternative, the height of the ring is preferably at most 50% lower, in particular at most 30% lower, than the height of the magnet in respect of the direction of movement of the magnet.

It is expedient that the electrically conductive ring substantially forms the housing.

It is preferred that the housing is formed in sections from several layers of different materials, wherein the ring is configured as one of the layers. Here, these layers are configured one above another and/or one surrounding another or next to one another in the housing.

The at least one electrically conductive ring is preferably formed from a semiconductor material with adaptively variable electrical resistance.

It is preferred that the actuator, in addition to the electrically conductive ring, has an additional electrically conductive ring in each case above it and below it in respect of the direction of movement of the magnet, in particular flush and/or cross-sectionally in alignment or substantially identically in respect of the cross section, wherein the two additional electrically conductive rings have, in particular, a specific electrical conductivity which is different from the first or central ring, wherein these two additional rings particularly preferably project beyond the height of the magnet on either side in respect of the undeflected state of the magnet. These two additional electrically conductive rings are very particularly preferably formed from aluminum.

It is preferred that the coil is arranged on the inner lateral surface of the housing and the electrically conductive ring is arranged on the outside around the coil.

It is expedient that the magnet has a pole plate composed of ferromagnetic material in each case at the top and at the bottom in respect of its height, said pole plates in particular having substantially the same base area as the magnet.

It is preferred that the magnet has, along its direction of movement, a guide that provides centering in respect of the housing, in particular the guide is formed here by a plurality of spring elements by means of which the magnet is directly or indirectly suspended from the housing.

The design parameter a preferably describes/defines the ratio of the height of the magnet to the height of the ring in the direction of vibration. Here, the range for 0.5≤a≤2 is particularly relevant here, where an approximately linear characteristic for the resetting force is produced for a>1 and a progressive characteristic for the resetting force is produced for a<1.

The housing and/or the ring and/or the additional ring are expediently entirely or partially manufactured from the materials iron or nickel or cobalt and/or contain one, two or all of these materials.

The ring is preferably configured in respect of its electrical conductivity or in respect of its electrically conductive material such that said ring or said material has an electrical resistivity of between 0.22 μΩ·m and 920 Ω·m.

The housing and/or the ring and/or the additional ring are expediently entirely or partially formed in respect of their/its ferromagnetic material from the materials iron or aluminum or copper or nickel, cobalt or magnesium or carbon.

The ring and/or one or more additional rings are/is preferably configured in respect of their/its electrical conductivity or in respect of their/its electrically conductive material such that the housing is constructed in a layered manner in sections, in particular in the radial or tangential or axial direction, from several different materials with different electrical resistivities.

REFERENCE SIGNS

Magnet
Pole plate
Spring element
Housing
Direction of movement of the magnet
Undeflected state
Component that is excited to vibrate
Coil
Ring
Magnetic forces or resetting forces between the magnet and the ferromagnetic material of the ring or of an additional ring
Height of the ring
Height of the magnet or total height of the magnet with pole plates

DETAILED DESCRIPTION OF THE PREFERRED EMBODIMENTS

Figure 1:
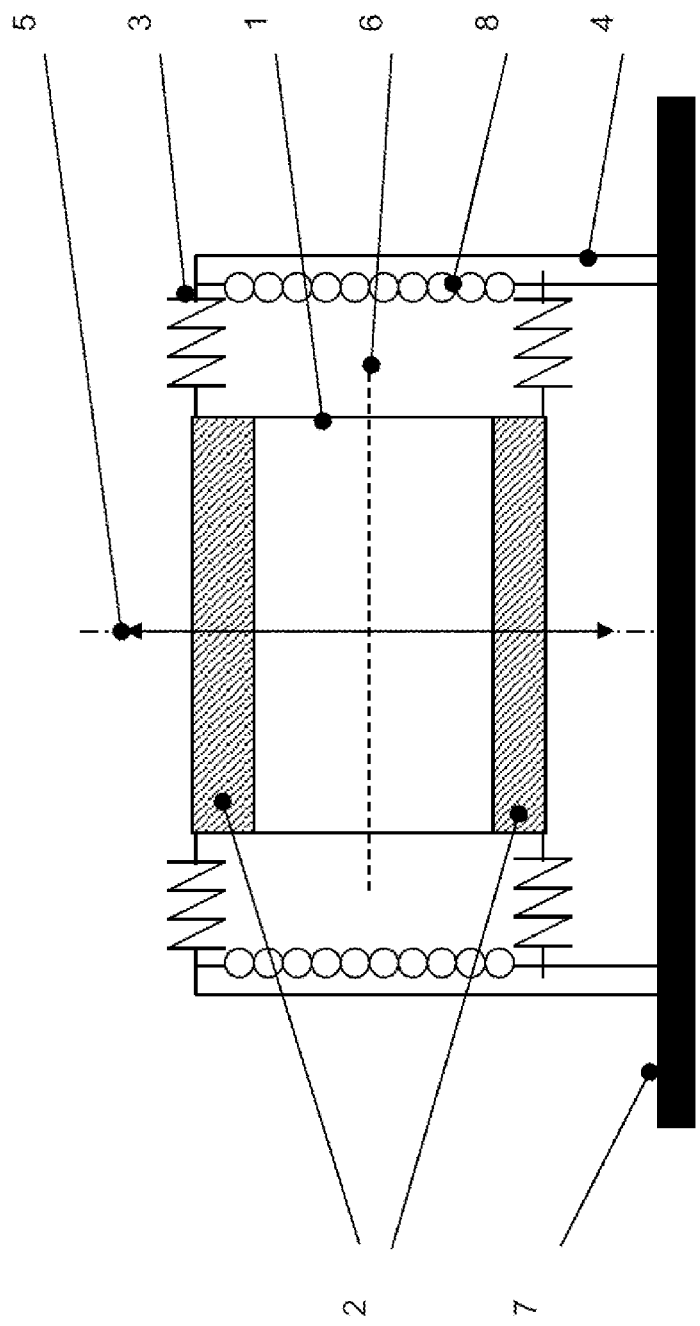
FIG. 1 shows the schematic design of an exemplary embodiment of an actuator or electrodynamic vibration exciter.

FIG. 1 shows the schematic design of an exemplary embodiment of an actuator or electrodynamic vibration exciter. Pole plates 2 are fitted to the two poles of the magnet 1. The overall vibrating system comprising the magnet 1 and pole plates 2 is elastically coupled to the housing 4 by means of spring elements 3 in such a way that vibration is possible mainly in the illustrated direction of vibration or direction of movement 5 of the magnet 1, wherein the vibration takes place about a central inoperative position or undeflected state 6. The housing 4 is coupled to the component 7 which is excited to vibrate and is configured, for example, as a flat structure. The coil 8 which is joined to the housing 4 is electrically excited, so that current flows in the coil. Owing to the interaction between the coil 8, through which current flows, and the magnet 1 and pole plates 2, excitation forces are produced between the coil 8 and pole plates 2, this leading to mechanical vibrations being excited in the flat structure 7.

Figure 2:
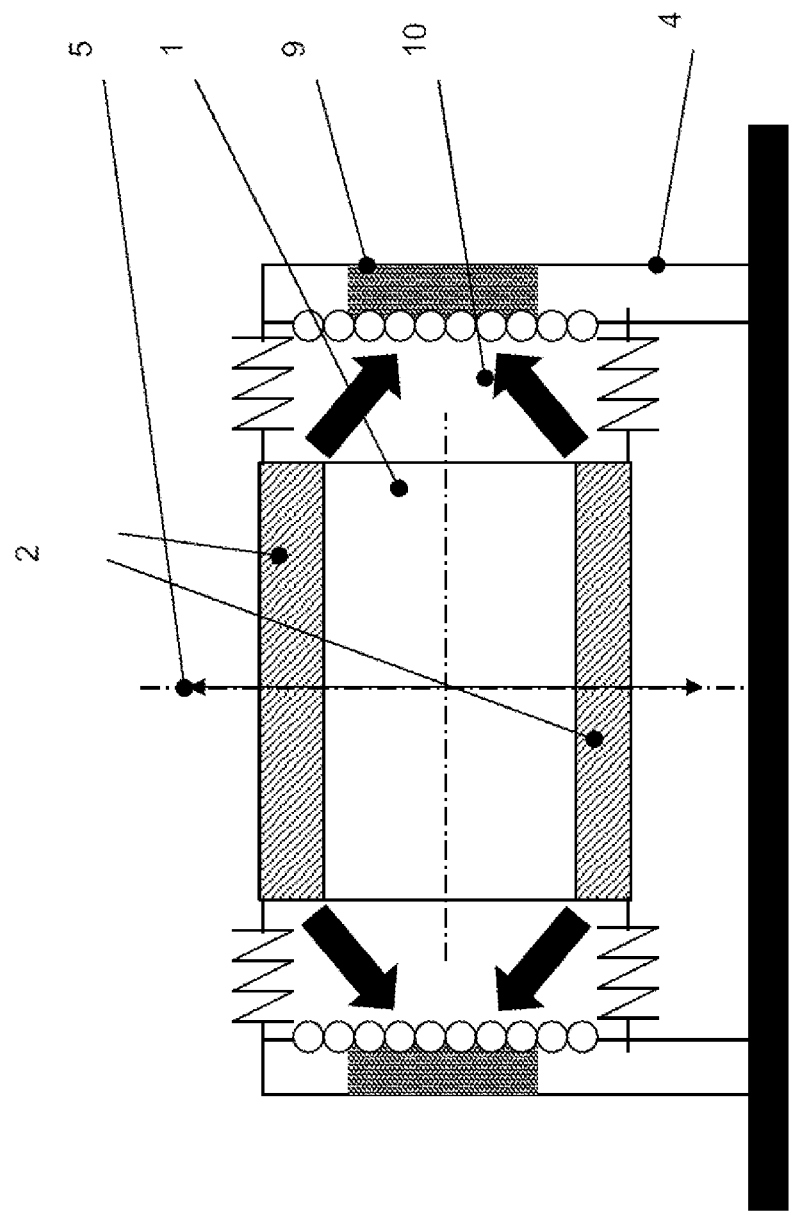
FIG. 2 shows, for example, in a schematically illustrated manner, a centering, magnetic resetting force 10 through the ferromagnetic material in the ring 9 in the housing 4 arranged, according to an aspect of the invention.

FIG. 2 shows, for example, in a schematically illustrated manner, a centering, magnetic resetting force 10 through the ferromagnetic material in the ring 9 in the housing 4 arranged. The magnetic field generated by the magnet 1 and concentrated by the pole plates 2 creates magnetic forces 10 in the direction of the ferromagnetic material of the ring 9. Therefore, the magnet 1 is centered in the direction of deflection 5 with its pole plates 2 always approximately around the ferromagnetic material of the ring 9. According to the example, the ring 9 is also formed from electrically conductive material, as a result of which damping of the vibration or deflection movement of the magnet 1 along its direction of movement 5 is additionally achieved.

Figure 3B:
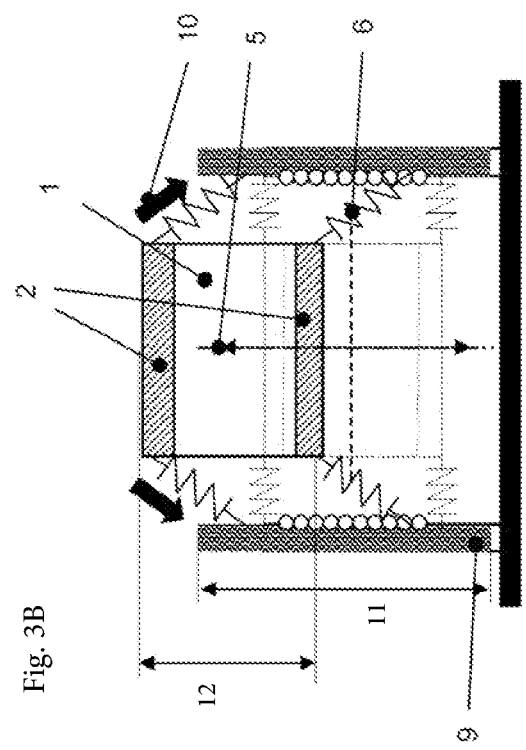
FIGS. 3A and 3B schematically illustrate an actuator according to an aspect of the invention.
Figure 3A:
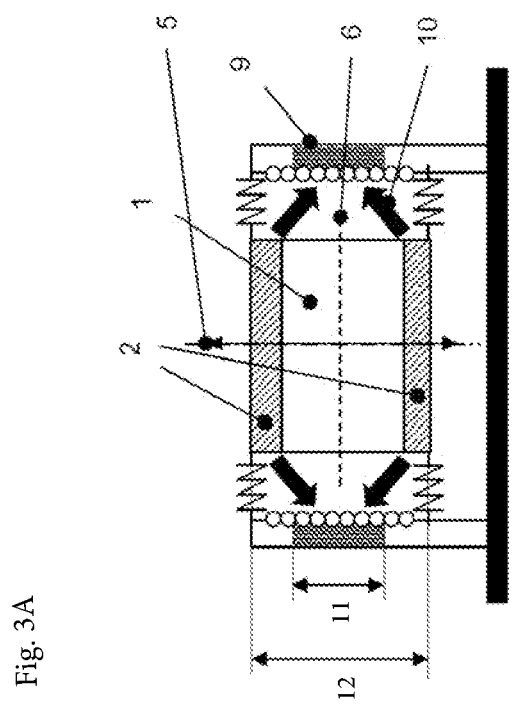

FIG. 3A schematically illustrates, according to the example, an actuator, wherein the height 11 of the ring 9 composed of ferromagnetic $h_{ferro}$ and electrically conductive material is lower than the total height 12 of the magnet 1 and pole plates 2 $h_{Magnet}$. As a result, magnetic self-centering in the direction of deflection 5 already takes place by means of the magnetic forces or resetting forces 10 without deflection out of the inoperative position or undeflected state 6.

In addition, owing to the ring 9 being formed from electrically conductive material, eddy currents are induced in the ring 9 during the course of movement of the magnet 1, wherein these eddy currents oppose the movement of the magnet in accordance with Lenz's law and as a result damp the movement of the magnet.

FIG. 3B schematically shows an exemplary embodiment of the actuator, wherein the height 11 of the ring 9 composed of ferromagnetic and electrically conductive material $h_{ferro}$ is greater than the total height 12 of the magnet 1 and pole plates 2 $h_{Magnet}$. As a result, according to the example, magnetic self-centering in the direction of deflection 6 takes place by means of the magnetic forces 10 when the deflection of the magnet 1 is so great that one pole plate 2 protrudes beyond the edge of the ring 9. Therefore, a progressive spring characteristic curve can be produced.

Figure 4A:
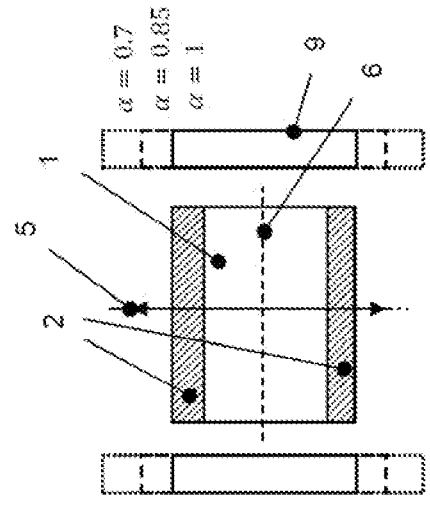
FIGS. 4A and 4B show the characteristic of the magnetic resetting force for various values, according to an aspect of the invention.
Figure 4B:
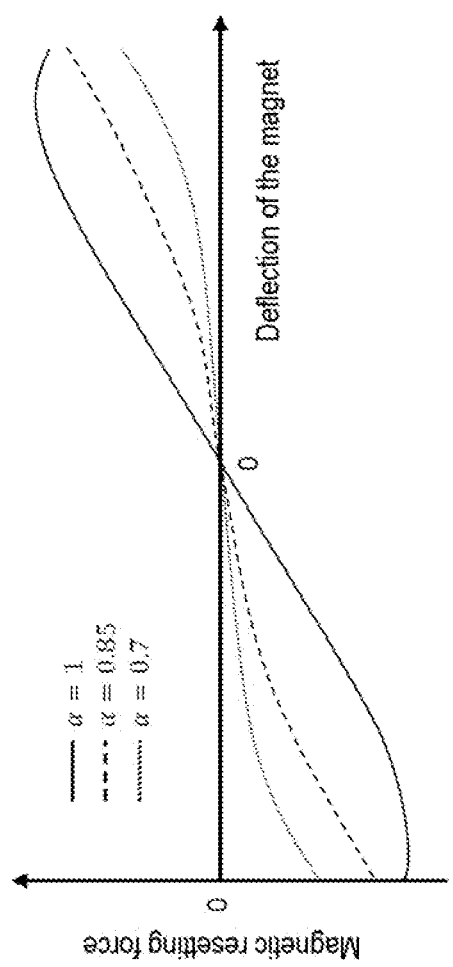

FIGS. 4A and 4B schematically show, by way of example, the characteristic of the magnetic resetting force for various values of $\alpha$ ($=h_{Magnet}/h_{ferro}$). If the height of the ring 9 composed of ferromagnetic material in the direction of vibration 5 is the same as the sum of the total height of the magnet 1 and its pole plates 2 on either side (a=1), a virtually linear characteristic of the magnetic resetting force around the inoperative position or undeflected state 6 is produced. If the height of the ring 9 composed of ferromagnetic material in the direction of vibration 5 is greater than the total height of the magnet 1 and its pole plates 2 on either side (a<1), a progressive characteristic of the magnetic resetting force around the inoperative position 6 is produced. The profile of the magnetic resetting forces depending on the deflection of the magnet is shown by FIG. 4B here.

The invention claimed is:

1. An actuator for exciting at least one component of a motor vehicle with vibrations,
   the actuator comprising:
   a housing which is configured to be directly or indirectly connected to the component,
   at least one electrical coil which is connected to the housing and is configured to generate an electromagnetic field when an electric current flows through the coil, and
   at least one magnet which is entirely or partially arranged in the housing and
   the magnet is arranged so as to be movable to a limited extent relative to the housing,
   wherein the housing has, all around, at least one electrically conductive ring which surrounds the magnet in respect of its undeflected state, wherein the electrically conductive ring substantially forms the housing; and
   at least one additional ring composed of ferromagnetic material,
   wherein the additional ring is arranged on an outside of the housing around the at least one electrical coil.

2. The actuator as claimed in claim 1, wherein the electrically conductive ring is partially or fully incorporated into the housing.

3. The actuator as claimed in claim 1, wherein the housing is formed in sections from several layers of different materials, wherein the ring is configured as one of the layers.

4. The actuator as claimed in claim 1, wherein the at least one electrically conductive ring is formed from a semiconductor material with adaptively variable electrical resistance.

5. The actuator as claimed in claim 1, wherein the electrically conductive ring is formed from ferromagnetic material, and wherein the additional ring surrounds the magnet in respect of its undeflected state.

6. The actuator as claimed in claim 5, wherein the electrically conductive ring surrounds the additional ring, or the other way around, and the electrically conductive ring and the additional ring are in this case arranged together in or on the housing or are part of the housing.

7. The actuator as claimed in claim 5, wherein the electrically conductive ring and the additional ferromagnetic ring are not permanently magnetized.

8. The actuator as claimed in claim 1, wherein a height of the ring is substantially equal to a height of the magnet in respect of a direction of movement of the magnet.

9. The actuator as claimed in claim 8, wherein the height of the ring is at most 50% greater than the height of the magnet in respect of the direction of movement of the magnet.

10. The actuator as claimed in claim 8, wherein the height of the ring is at most 50% lower than the height of the magnet in respect of the direction of movement of the magnet.

11. The actuator as claimed in claim 8, wherein the height of the ring is at most 30% greater than the height of the magnet in respect of the direction of movement of the magnet.

12. The actuator as claimed in claim 8, wherein the height of the ring is at most 30% lower than the height of the magnet in respect of the direction of movement of the magnet.

* * * * *